UNITED STATES PATENT OFFICE.

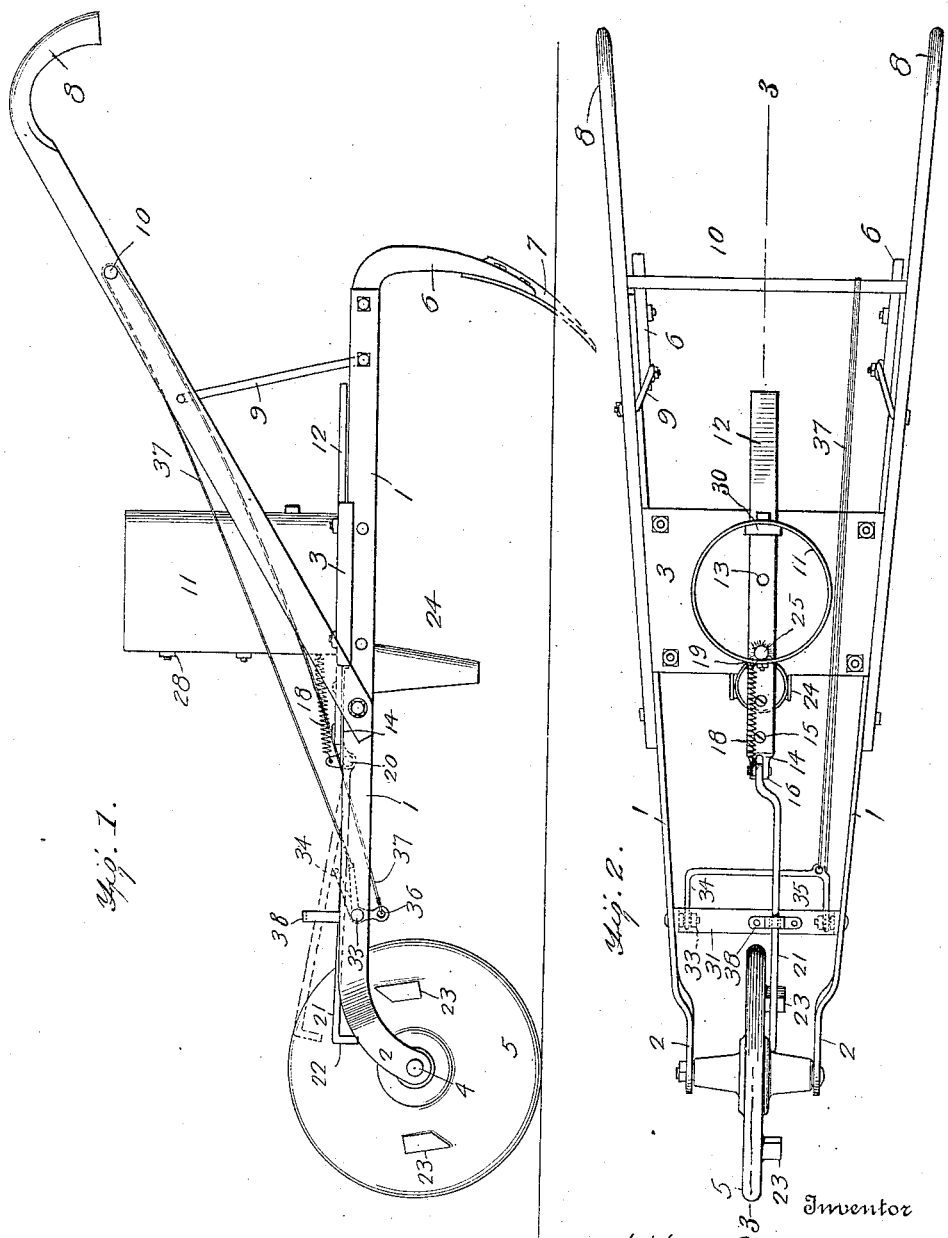

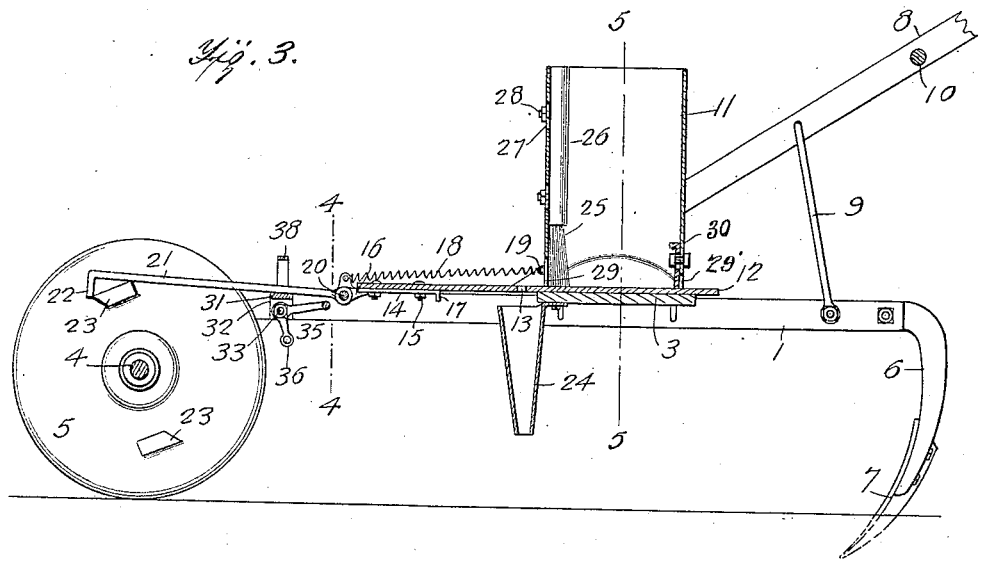
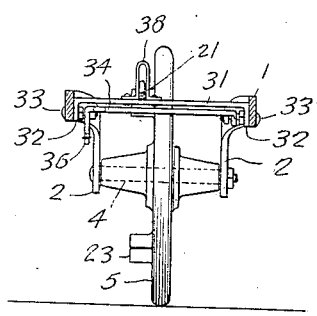
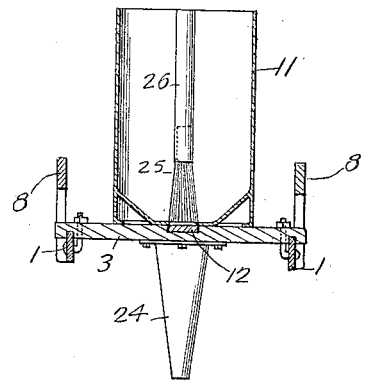

JOSEPH WEED CONNELL, OF NASHVILLE, GEORGIA.

SEED-PLANTER.

1,049,053.  Specification of Letters Patent.  Patented Dec. 31, 1912.

Application filed December 2, 1911. Serial No. 663,479.

*To all whom it may concern:*

Be it known that I, JOSEPH WEED CONNELL, a citizen of the United States, residing at Nashville, in the county of Berrien and State of Georgia, have invented new and useful Improvements in Seed-Planters, of which the following is a specification.

This invention relates to seed planters, and it has for its object to produce a planter of simple and improved construction whereby seeds of various kinds may be dropped or deposited in hills at any desired distance apart.

A further object of the invention is to provide simple and improved means whereby the seed dropping mechanism may be thrown into and out of gear.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings,—Figure 1 is a side elevation of a seed planter constructed in accordance with the invention. Fig. 2 is a top plan view of the same. Fig. 3 is a longitudinal vertical sectional view taken on the line 3—3 in Fig. 2. Fig. 4 is a transverse sectional view taken on the line 4—4 in Fig. 3, in front of the seed box looking in a forward direction. Fig. 5 is a longitudinal sectional detail view taken on the line 5—5 in Fig. 3.

Corresponding parts in the several figures are denoted by like characters of reference.

The frame of the improved seed planter is composed of side bars 1, 1 having downturned front ends 2 and converging slightly in a forward direction, as best seen in Fig. 2, said frame bars being connected and spaced apart by means of a platform 3 which is bolted or otherwise secured thereon. The downturned front ends 2 of the side bars 1 afford bearings for an axle 4 carrying a wheel 5, the circumference of which presents a moderately sharp edge that will serve to form a seed receiving furrow.

Secured upon the rear ends of the side bars 1 are shanks 6 carrying blades 7 that will serve to throw the dirt in the direction of the furrow to cover the seed. Handles 8, whereby the machine may be guided, are secured upon the side bars 1 and are connected with said side bars by braces 9, said handles being connected together by a round 10.

Supported on the platform 3 is a hopper 11 which may be cylindrical, as shown, or of any other suitable and convenient shape, said hopper being provided adjacent to the platform 3 with apertures for the passage of a longitudinal reciprocatory seed slide 12 having an opening or aperture 13 constituting a seed cup. The dimensions of said cup may be varied according to the size and character of the seed that is to be planted and according to the amount of the charge. For planting large seed, such as peanuts, the seed slide may be made of wood of proper thickness, and an elongated aperture of the desired size may be formed therein. For smaller seeds a slide of sheet metal may be profitably employed. The seed slide is provided at its front end with a plate 14 secured thereon by fastening means, such as bolts or rivets 15, said plate having its front end doubled or folded downwardly to form lugs 16 and said plate having at its rear end a downturned flange 17, which latter, by abutting against the front edge of the platform 3, serves to limit the rearward movement of the seed slide. The seed slide is retracted in a rearward direction by means of a spring 18 which connects the front end of the plate 14 with an eye 19 on the front side of the hopper. The lugs 16 are apertured for the passage of a pin 20 supporting a pivoted rod 21 extending forwardly adjacent to the wheel 5 and having at its front end a downturned hook 22 lying in the path of blocks or tappets 23 which are secured on the side of the wheel. These blocks or tappets are preferably of rectangular shape, and any desired number of said blocks may be used at suitable intervals for the purpose of engaging the hooked rod to pull the seed slide in a forward direction against the tension of the retracting spring 18.

Secured to the front edge of the platform 3 is a funnel-shaped spout 24 for the purpose of conducting the seed to the furrow.

Suitably mounted within the hopper on the front wall of the latter is a cut-off brush 25, said brush being provided with a handle 26 having a slot 27 for the passage of a bolt 28 whereby it is adjustably secured in such a manner as to engage the upper face of the seed slide adjacent to the slot or opening 29 in the front wall of the hopper. This slot is made of such dimensions that slides of various thicknesses may be accommodated, and when a slide of a different thickness is introduced in the hopper, the cut-off brush may be readily adjusted to engage the same, as shown. The aperture 29' in the rear wall of the hopper through which the seed slide extends is also made of suitable size to accommodate slides of various thicknesses, and a slide 30 is adjustably mounted adjacent to said aperture to partially obstruct the same so as to admit of the use of slides of various thicknesses.

The side bars 1 of the frame are connected and spaced apart near their front ends by means of a cross bar 31 having downturned ends 32 secured by means of bolts 33 which also serve to pivotally support a yoke or bail 34 lying below the hooked rod 21 whereby the seed slide is actuated. The yoke or bail 34 is provided with a downturned arm 35, and said yoke or bail is provided with an eye 36 which is connected with the arm 35 by a flexible member, such as a cord 37, which is guided over the round 10 that connects the handles, said cord being kept taut so that it will be retained in position by frictional engagement with the round 10. A keeper 38 extending upwardly from the cross bar 31 serves to guide the hooked rod 21.

In operation, when the machine is drawn over the field for which purpose draft means, not shown in the drawing, may be connected with the front end of the frame, the wheel 5 will form a furrow or depression in the ground for the reception of seed. As the wheel revolves, the blocks or tappets 23 will engage the underside of the rod 21 and by contact with the hook 22 will pull said rod and the seed slide in a forward direction against the tension of the retracting spring 18, the rod 21 being guided by the keeper 38, whereby it is held in engagement with the tappets. As each tappet becomes disengaged from the hook 22, the seed slide, together with the rod 21 is retracted by the spring 18. The seed slide by each forward movement carries a charge of seed contained in the aperture 13 beneath the cut-off brush 25 and through the aperture 29 in the front wall of the hopper until it registers with the upper end of the seed tube 24 into which the seed is dropped, being conducted by said tube to the furrow where it is discharged. As the seed slide is retracted, it receives a fresh charge from the contents of the hopper. The seed is covered by the blades 7 carried by the standards 6. When, for any reason, it shall be desired to suspend the operation of the seed dropping mechanism, the end of the flexible element 37 which is connected with the arm 36 of the yoke or bail 34 is pulled by the operator, thus swinging the yoke or bail upward and lifting the rod 21 to a position where the hook at the front end of said rod will be supported out of the path of the blocks or tappets 23. To restore the mechanism to its operative condition, the end of the flexible element 37 which is connected with the eye 36 of the yoke 34 is pulled by the operator, and said yoke will thus be moved out of the path of the rod 21 which will thus drop by gravity to its normal operative position. The yoke 34 will be maintained in adjusted position by the flexible element 37 which frictionally engages the round 10 over which it is guided, thus permitting the desired adjustment to be easily and quickly effected.

Having thus described the invention, what is claimed as new, is:—

In a seed planter, a frame including side bars, a platform connecting said side bars, and a cross bar connecting the side bars in front of the platform, said cross bar having downturned ends, fastening means extending through the downturned ends, a yoke pivoted on said fastening means and having an eye and a downwardly extending arm, handles connected with the side bars of the frame, a round connecting said handles, a flexible member connecting the eye of the yoke with the downwardly extending arm, said flexible element being guided over and in frictional engagement with the round connecting the handles, a keeper extending upwardly from the cross bar, a hopper supported on the platform, a longitudinal reciprocatory spring actuated seed slide guided through the hopper, a ground engaging wheel at the front end of the frame having laterally extending tappets, and a rod pivotally connected with the front end of the seed slide for movement in a vertical plane, said rod being guided through the keeper, extending upwardly from the cross bar and having at its front end a hook disposed in the path of the tappets, said rod being also positioned above and in the path of the upward movement of the yoke.

In testimony whereof I affix my signature in presence of two witnesses.

JOS. WEED CONNELL.

Witnesses:
CECIL B. McCALL,
JAMES H. GASKINS.

---

Copies of this patent may be obtained for five cents each, by addressing the "Commissioner of Patents, Washington, D. C."